(12) United States Patent
Tucker et al.

(10) Patent No.: US 6,222,170 B1
(45) Date of Patent: Apr. 24, 2001

(54) APPARATUS AND METHOD FOR MICROWAVE PROCESSING OF MATERIALS USING FIELD-PERTURBING TOOL

(75) Inventors: Denise A. Tucker, Raleigh; Zakaryae Fathi, Cary, both of NC (US); Robert J. Lauf, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/382,414

(22) Filed: Aug. 24, 1999

(51) Int. Cl.[7] .................................................. H05B 6/72
(52) U.S. Cl. .................................. 219/748; 118/723 MW
(58) Field of Search .................................. 219/748, 749, 219/745, 752–755, 750, 751; 118/50.1, 723 MW, 723 AN

(56) References Cited

U.S. PATENT DOCUMENTS

| | | | |
|---|---|---|---|
| 2,618,735 | * 11/1952 | Hall | 219/748 |
| 3,566,066 | * 2/1971 | Borthwick et al. | 219/748 |
| 3,611,135 | 10/1971 | Margerum . | |
| 3,843,863 | * 10/1974 | Fitzmayer | 219/745 |
| 3,916,137 | * 10/1975 | Jurgensen | 219/696 |
| 3,946,187 | * 3/1976 | MacMaster et al. | 219/748 |
| 4,144,468 | 3/1979 | Mourier . | |
| 4,176,266 | * 11/1979 | Kaneko et al. | 219/749 |
| 4,196,332 | 4/1980 | McKay B et al. . | |
| 4,340,796 | 7/1982 | Yamaguchi et al. . | |
| 4,415,789 | 11/1983 | Nobue et al. . | |
| 4,504,718 | 3/1985 | Okatsuka et al. . | |
| 4,593,167 | 6/1986 | Nilssen . | |
| 4,629,849 | * 12/1986 | Mizutani et al. | 219/749 |
| 4,777,336 | 10/1988 | Asmussen . | |
| 4,825,028 | 4/1989 | Smith . | |
| 4,843,202 | 6/1989 | Smith et al. . | |
| 4,866,344 | 9/1989 | Ross et al. . | |
| 4,939,331 | 7/1990 | Berggren et al. . | |
| 5,160,819 | * 11/1992 | Ball et al. | 219/748 |
| 5,308,944 | * 5/1994 | Stone-Elander et al. | 219/687 |
| 5,318,754 | 6/1994 | Collins et al. . | |
| 5,321,222 | 6/1994 | Bible et al. . | |
| 5,449,887 | 9/1995 | Holcombe et al. . | |
| 5,520,886 | 5/1996 | Bennett . | |
| 5,536,292 | 7/1996 | Holcombe et al. . | |
| 5,646,489 | * 7/1997 | Kakehi et al. | 118/723 MW |
| 5,700,326 | * 12/1997 | Takatsu et al. | 118/723 MW |
| 5,874,715 | * 2/1999 | Choi | 219/746 |
| 5,961,871 | * 10/1999 | Bible et al. | 219/709 |
| 5,994,686 | * 11/1999 | Salina | 219/745 |

FOREIGN PATENT DOCUMENTS

| | | | |
|---|---|---|---|
| 1291775 | * 10/1972 | (GB) | 219/751 |
| 47-50693 | * 12/1972 | (JP) | 219/751 |
| 64-2292 | * 1/1989 | (JP) | 219/751 |
| 1-279593 | * 11/1989 | (JP) . | |
| 1-279594 | * 11/1989 | (JP) . | |
| 4-188592 | * 7/1992 | (JP) | 219/748 |

OTHER PUBLICATIONS

A. K. Bose et al "Microwave–Induced Rapid Reactions for Preparative Organic Chemistry," Proc. 29th Microwave Power Symp., pp 35–38 Int'l Microwave Power Inst., Jul. 25–7, 1994, Chicago IL.

(List continued on next page.)

*Primary Examiner*—John A. Jeffery
(74) *Attorney, Agent, or Firm*—Joseph A. Marasco; Kirk A. Wilson

(57) ABSTRACT

A variable frequency microwave heating apparatus designed to allow modulation of the frequency of the microwaves introduced into a multi-mode microwave cavity for heating or other selected applications. A field-perturbing tool is disposed within the cavity to perturb the microwave power distribution in order to apply a desired level of microwave power to the workpiece.

30 Claims, 17 Drawing Sheets

OTHER PUBLICATIONS

H. D. Kimrey et al, "Microwave Sintering of Zirconia–Toughened Alumina Composites," Mat. Res. Soc. Symp. Proc., vol. 189, pp 243–55, 1991.

Terry N. Tiegs et al, "Comparison of Properties of Sintered and Sintered Reaction–Bonded Silicon Nitride Fabricated by Microwave & Conventional Heating," Mat. Res. Soc. Symp. Proc., vol. 347, pp 501–6, 1994.

R. A. Abramovitch, "Applications of Microwave Energy in Organic Chemistry. A Review," Org. Prep. Proceed. Int.,2, pp. 683–711,1991.

R. J. Lauf et al, "2 to 18 GHz Broadband Microwave Heating Systems,"0 Microwave Journal, Nov. 1993.

B. MacKay et al, "Frequency Agile Sources for Microwave Ovens," Journal of Microwave Power, 14 (1), 1979.

C. E. Holcombe et al "Importance of 'Casketing' for Microwave Sintering of Materials," Journal of Materials Science Letters 9 425–428, 1990.

C. E. Holcombe et al "Microwave Sintering of Titanium Diboride," Journal of Materials Science 26, 3730–3738, 1991.

* cited by examiner

EMPTY CAVITY

WORKPIECE

WORKPIECE + TOOL

APPARATUS AND METHOD FOR MICROWAVE PROCESSING OF MATERIALS USING FIELD-PERTURBING TOOL

This application is related to U.S. patent application Ser. No. 09/379,850 entitled "Apparatus and Method for Microwave Processing of Liquids", filed on even date herewith, and herein fully incorporated by reference.

The United States Government has rights in this invention pursuant to contract no. DE-AC05-96OR22464 between the United States Department of Energy and Lockheed Martin Energy Research Corporation.

TECHNICAL FIELD

The present invention relates to applications of microwave energy for processing materials, and more particularly to the use of tooling within the microwave cavity of a variable-frequency microwave furnace in order to selectively vary the microwave power applied to the workpiece.

BACKGROUND OF THE INVENTION

In the field of microwave energy, it is well known that microwave ovens, furnaces, and the like are typically constructed with a fixed operating frequency. It has long been known that the interactions of various materials with microwaves are frequency dependent. These interactions may include curing rubber and sintering ceramics. It is therefore desirable to have a microwave furnace that can be operated over a broad frequency range.

Typical microwave energy sources have a very narrow bandwidth because they employ a resonant cavity. For example, microwave ovens constructed for home use are provided with a magnetron which operates at 2.45 GHz, which is a frequency that has been allocated by the FCC for domestic heating applications. Due to the coupling ability of a 2.45 GHz microwave to water, these ovens are used for cooking foods, drying, and other purposes wherein the principal material to be acted upon is water. However, it is well known that frequencies in this range are not optimal in all situations, such as with heating plasmas, sintering materials such as ceramics, and preparing films such as diamond films.

The use of frequency sweeping over a wide range as a means of mode stirring has important implications for the use of microwave power to sterilize medical equipment or contaminated wastes. In such uses it is crucial to eliminate "dead" areas in the cavity wherein sufficient power may not be received in order for complete sterilization. Electronic frequency sweeping may be performed at a high rate of speed, thereby creating a much more uniform time-averaged power density throughout the furnace cavity. The desired frequency sweeping may be accomplished through the use of a variety of microwave electron devices. A helix traveling wave tube (TWT), for example, allows the sweeping to cover a broad bandwidth (e.g., 2 to 8 GHz) compared to devices such as the voltage tunable magnetron (2.45±0.05 GHz). Other devices such as klystrons and gyrotrons have other characteristic bandwidths, which may be suitable for some applications.

Further, fixed-frequency microwave ovens typically found in the home are known to have cold spots and hot spots. Such phenomena are attributed to the ratio of the wavelength to the size of the microwave cavity. With a relatively low frequency microwave introduced into a small cavity, standing waves occur and thus the microwave power does not uniformly fill all of the space within the cavity, and the unaffected regions are not heated. In the extreme case, the oven cavity becomes practically a "single-mode" cavity.

Attempts have been made at mode stirring, or randomly deflecting the microwave "beam", in order to break up the standing modes and thereby fill the cavity with the microwave energy. One such attempt is the addition of rotating fan blades at the beam entrance of the cavity.

Another method used to overcome the adverse effects of standing waves is to intentionally create a standing wave within a single-mode cavity such that the workpiece may be placed at the location determined to have the highest power (the hot spot). Thus, only that portion of the cavity wherein the standing wave is most concentrated will be used.

The frequency for most efficient processing may vary for a given material as the heating process occurs. As a material changes phases, a varied frequency may be required. Thus, it may be desired to have the capability of varying the frequency in the heating process, allowing the operator to begin heating the workpiece at one frequency and then change the frequency to maintain good coupling as the temperature rises. This may also be desirable when heating composite materials, where the varying materials efficiently react at different frequencies.

Other devices have been produced to change the parameters of the heating process of selected materials. Typical of the art are those devices disclosed in the following U.S. Patents:

| Patent No. | Inventor(s) | Issue Date |
|---|---|---|
| 3,611,135 | D. L. Margerum | October 5, 1971 |
| 4,144,468 | G. Mourier | March 13, 1979 |
| 4,196,332 | A. MacKay B, et al. | April 1, 1980 |
| 4,340,796 | M. Yamaguchi, et al. | July 20, 1982 |
| 4,415,789 | T. Nobue, et al. | November 15, 1983 |
| 4,504,718 | H. Okatsuka, et al. | March 12, 1985 |
| 4,593,167 | O. K. Nilssen | June 3, 1986 |
| 4,777,336 | J. Asmussen | October 11, 1988 |
| 4,825,028 | P. H. Smith | April 25, 1988 |
| 4,843,202 | P. H. Smith, et al. | June 27, 1989 |
| 4,866,344 | R. I. Ross, et al. | September 13, 1989 |
| 4,939,331 | B. Berggren, et al. | July 3, 1990 |
| 5,321,222 | D. W Bible et al. | June 14, 1994 |

The subject matter disclosed by MacKay ('332) is further discussed in an article authored by MacKay B, et al., entitled "Frequency Agile Sources for Microwave Ovens", *Journal of Microwave Power*, 14(1), 1979.

A microwave furnace having a wide frequency range is described in commonly assigned U.S. Pat. No. 5,321,222, the entire disclosure of which is incorporated herein by reference.

Pending commonly assigned application Ser. No. 08/413,608, filed on Mar. 30, 1995, now U.S. Pat. No. 5,961,871, the entire disclosure of which is incorporated herein by reference, describes how frequency sweeping over a selected bandwidth, typically 5%, can establish a substantially uniform microwave power distribution within the cavity by the superposition of many hundreds of microwave modes.

OBJECTS OF THE INVENTION

Objects of the present invention include at least the following:

Provision of a microwave heating apparatus wherein a workpiece may be subjected to a controlled application of microwave energy;

Provision of a microwave heating apparatus wherein a workpiece may be processed uniformly despite geometrical discontinuities on its surface;

Provision of a microwave heating apparatus wherein a workpiece may be uniformly exposed to a plasma over a selected portion of its surface;

Provision of a microwave heating apparatus wherein plurality of workpieces may be subjected to a controlled application of microwave energy in either a batch or a piecewise manner;

Provision of a method of applying a controlled concentration of microwave energy to a workpiece of a desired size and shape;

Provision of a method of uniformly processing a workpiece with microwave energy despite discontinuities on the workpiece itself;

Provision of a method of processing a workpiece by the uniform generation of a plasma adjacent to a selected portion of the workpiece surface; and Provision of a method of microwave heating wherein frequency modulation may be used as a form of mode stirring to create a uniform power density and a tool is used to selectively perturb this power density to apply a desired level of microwave power to a workpiece.

Other objects and advantages will be accomplished by the present invention which is designed to allow modulation of the frequency of the microwaves introduced into a furnace cavity for heating or other selected processes. Some applicable processes include heat treatment, sterilization, sintering, plasma processing, ore processing, polymerization, etching, and preparing films.

Further and other objects and advantages of the present invention will become apparent from the description contained herein.

BRIEF DESCRIPTION OF THE DRAWINGS

In the FIGS., like elements are often identified with like numerals. An effort has been made to use different numerals where differences exist in similar elements.

DISCLOSURE OF THE INVENTION

The relatively uniform power distribution as described hereinabove can be perturbed by foreign objects within the cavity or by sharp discontinuities in the workpiece itself. (The occasional arcing from sharp metal objects in a home microwave oven is an example of well known forms of this phenomenon). Although these perturbations are generally thought to be undesirable, it has been discovered, surprisingly, that the phenomenon can be controllably and usefully employed, particularly as an adjunct to variable frequency microwave heating techniques. The useful perturbations can take a number of forms:

1. In a microwave-assisted plasma processing operation, for example, it might be desirable to selectively ignite a localized plasma adjacent to the workpiece. It has been discovered that such a plasma may be selectively ignited by a metallic field-perturbing tool in a suitable shape (such as a sharp edge) disposed close to the workpiece. At a single microwave frequency, this localized plasma is difficult to control and will often ignite only along part of the field-perturbing tool or will wander randomly along its length. However, under conditions wherein the microwave frequency is swept over an appropriate bandwidth the plasma ignites uniformly along the entire working surface of the field-perturbing tool. This surprising combination of localizing or concentrating microwave energy by the tool and maintaining uniformity and control within the useful working volume by the frequency sweeping technique represents one aspect of the present invention.

2. Other perturbations may arise from discontinuities in the workpiece itself. For example, when a silicon wafer is placed in a plasma processing system, a plasma may be excited selectively at the edge of the wafer because the wafer edge perturbs the electric field within the microwave cavity. At a single frequency, plasma may ignite at one or more localized spots along the circumference of the wafer. When the frequency is swept over a sufficient bandwidth, plasma ignites uniformly around the entire circumference of the Si wafer. Utilization of such a uniformly generated plasma represents another aspect of the present invention.

3. Under some circumstances, one might wish to suppress the aforementioned perturbation arising from discontinuities in the workpiece itself. In this case, the field-perturbing tool can be configured so that the local electric field is perturbed in a way that compensates for and cancels out perturbations caused by discontinuities of the workpiece, thereby improving the uniformity of the processing environment. In this case, using the field-perturbing tool to further enhance the use of frequency sweeping to create a uniform time-averaged power density over the entire surface or volume of the workpiece represents another aspect of the present invention.

Figure 13A:
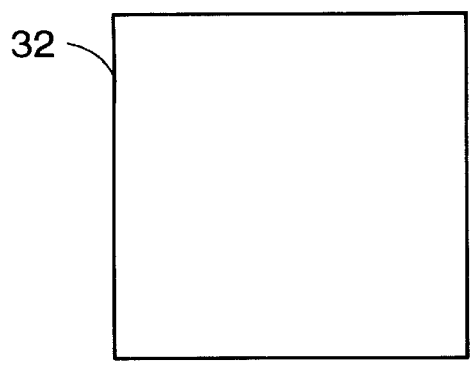
FIGS. 13a–13f illustrate schematically the electric field distribution in multimode cavity in a multimode cavity in accordance with the present invention.
Figure 13B:
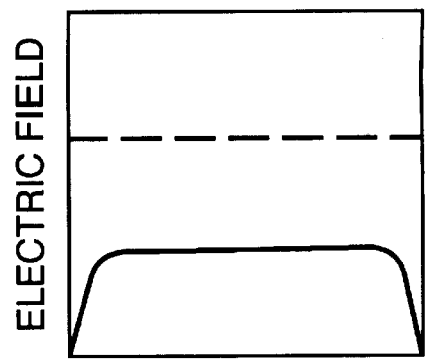
Figure 13C:
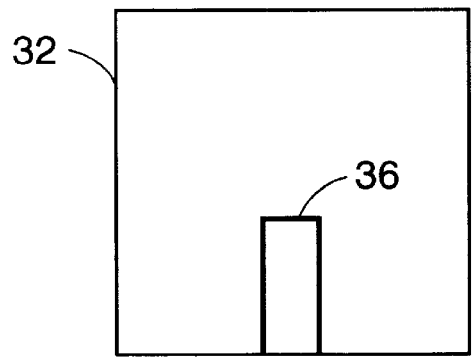
Figure 13D:
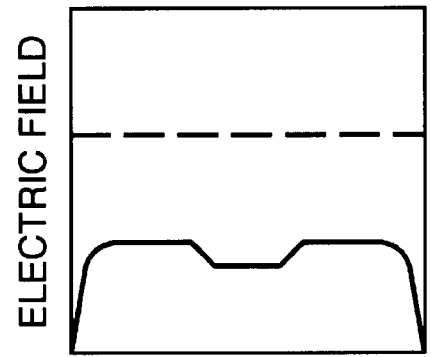
Figure 13E:
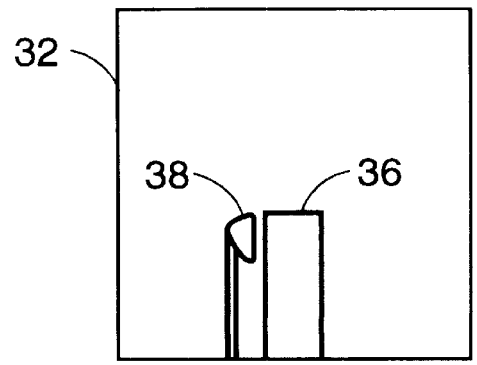
Figure 13F:
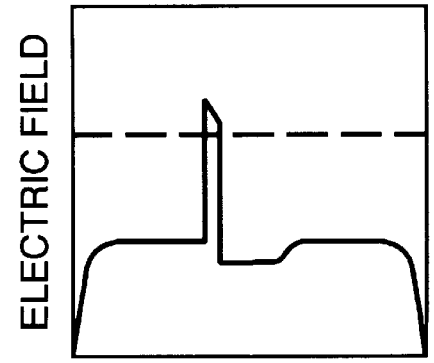
Figure 14A:
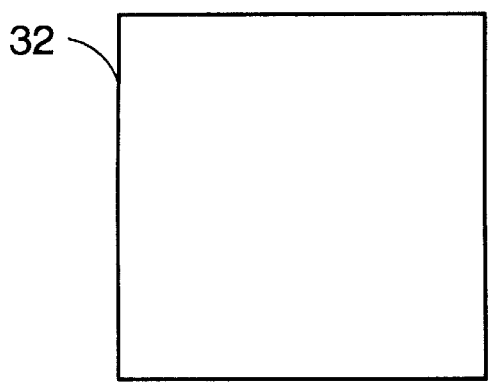
FIGS. 14a–14f illustrate schematically the electric field distribution in another multimode cavity in accordance with the present invention.
Figure 14B:
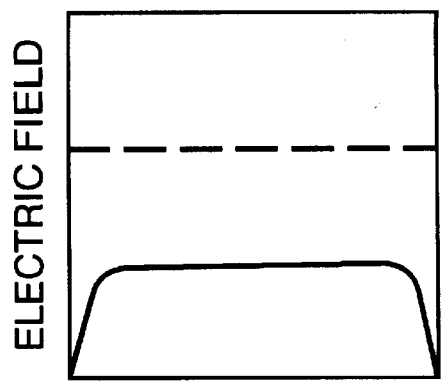

FIGS. 13a–f and 14a–f show schematically the results of various perturbations on the electric field within a multi-mode applicator cavity 32 in accordance with the present invention. Both cases assume that the microwave source has a useful bandwidth of at least about 5%, thereby creating a nominally uniform baseline electric field distribution within the unloaded cavity (FIGS. 13b and 14b).

FIGS. 13a–b represent an empty microwave cavity 32. FIGS. 13c–d represent the cavity 32 with a workpiece 36 comprised of an arbitrarily selected dielectric material. FIGS. 13e–f represent the cavity 32 containing both workpiece 36 and a field-perturbing 38 tool disposed in close proximity thereto. FIGS. 13b, 13d, and 13f show electric field strength across a cross-section of the cavity 32 shown in FIGS. 13a, 13c, and 13e, respectively. The dashed line 127 represents a plasma ignition threshold, and the solid line 34 represents the electric field distribution. Introduction of the field-perturbing tool 38 into a microwave cavity 32 creates a concentration of electric field 131 adjacent to one area of the workpiece 36 as shown in FIG. 13F. This concentration of power is sufficient to ignite a plasma in that one area, even though the average electric field within the cavity 32 is not sufficient to ignite or maintain a general plasma therein.

Figure 14C:
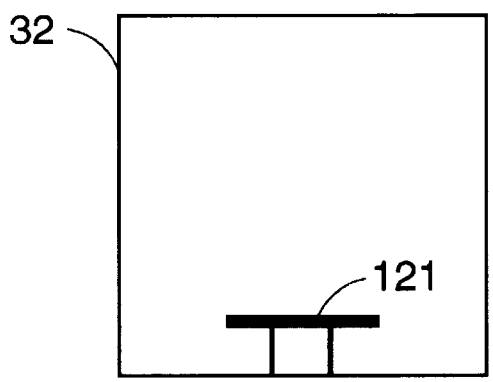
Figure 14D:
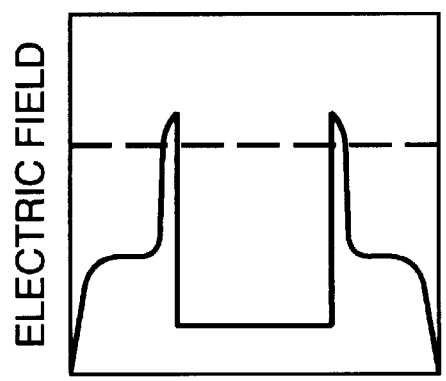
Figure 14E:
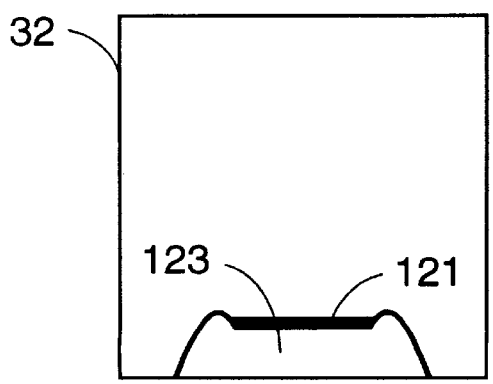
Figure 14F:
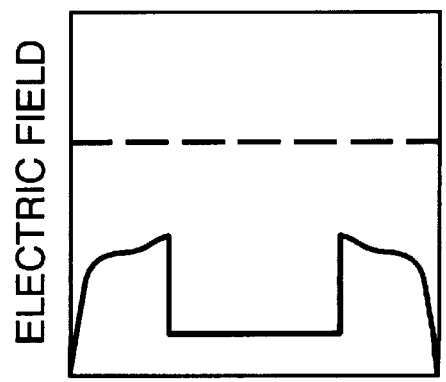

FIGS. 14a–b represent an empty microwave cavity 32. FIGS. 14c–d represent the cavity 32 with a workpiece 121 comprised of an arbitrarily selected dielectric material characterized by discontinuities (e.g., edges and irregularities) which create unwanted concentrations of electric field. FIGS. 14e–f represent the cavity 32 containing both workpiece 121 and an field-perturbing tool 123 disposed in proximity thereto for the purpose of reducing the unwanted concentrations of electric field. FIGS. 14b, 14d, and 14f show electric field strength across a cross-section of the cavity 32 shown in FIGS. 14a, 14c, and 14e, respectively. The dashed line 127 represents a plasma ignition threshold, and the solid line 129 represents the electric field distribution. Discontinuities in the workpiece 121 create undesired localized field concentrations in the cavity 32 that might lead to formation of an unwanted plasma 125 around the edge of the workpiece 121 as seen in FIG. 14d. Introduction of a field-perturbing tool 123 reduces the field to a value below the ionization threshold, thereby suppressing the undesired ignition of localized plasma 125 at the edge of the workpiece 121.

It will be appreciated that the field-perturbing tool may be grounded or held at some potential (or bias) relative to ground. It will be further understood that any potential above or below ground potential may be a DC or AC potential. The aforementioned ability to selectively bias the field-perturbing tool will further increase its utility and applicability for specific applications.

The field-perturbing tool of the present invention is not to be confused with various contrivances used generally to modify the thermal environment of the workpiece rather than to perturb the local electric field in a known and controllable way. A typical example is the introduction of relatively lossy materials such as silicon carbide whose role is to absorb microwave energy and convert that energy to radiant heat thereby providing supplemental or "hybrid" heating to the workpiece [see, for example, U.S. Pat. No. 5,318,754 entitled "Microwave Ashing Apparatuses and Components" by M. J. Collins et al. assigned to CEM Corporation]. That type of contrivance is referred to by various terms, such as the "picket fence" of Janney et al. [see H. D. Kimrey et al. "Microwave Sintering of Zirconia-Toughened Alumina Composites", Mat. Res. Soc. Symp. Proc. Vol. 189, pp. 243–55, 1991] and the "casketing" of Holcombe et al. ["Importance of "Casketing" for Microwave Sintering of Materials", Journal of Materials Science Letters 9 (1990), 425–428]. Other contrivances include thermal insulation around the workpiece as well as thermally conductive inserts such as boron nitride to spread the heat within these insulated "caskets" [see, for example, T. N. Tiegs et al. "Comparison of the Properties of Sintered and Sintered Reaction-Bonded Silicon Nitride Fabricated by Microwave and Conventional Heating", Mat. Res. Soc. Symp. Proc. Vol. 347, pp. 501–6, 1994]. Yet other contrivances of that nature include packaging for microwave heatable food products such as popcorn and the like. A field-perturbing tool may, of course, provide some supplemental heating because of its own dielectric loss, but such heating, if any, is an incidental benefit of the field-perturbing tool and not its primary purpose.

It will be appreciated that many processing operations involve batches of more or less identical components to be processed at the same time. A combination of variable-frequency microwave source and field-perturbing tool can be applied equally well to either batch or sequential processing by a properly designed multiple- or single-head tool respectively.

A microwave source is provided for generating a high-power microwave signal for input to the microwave cavity and to which the workpiece is subjected. The microwave source of the preferred embodiment is able to sweep a given range of frequencies, operate in pulse mode, modulate the frequency of the microwave signal, and produce various complex waveforms.

In the preferred embodiments of the present invention, the microwave source may employ any one of a helix traveling-wave tube (TWT), a coupled-cavity TWT, a ring-loop TWT, a ring-bar TWT, a klystron, a twystron, or a gyrotron. These devices are all familiar to those skilled in the art of microwave system design. In other embodiments of the present invention, the microwave source may employ a frequency-agile coaxial magnetron, the frequency of which can be tuned manually, mechanically, or electrically.

A directional coupler is typically provided for detecting the direction of a signal and further directing the signal depending on the detected direction. A signal received from the microwave source is directed toward the microwave cavity. A signal received from the direction of the microwave cavity is directed toward a reflected power load. The directional coupler thus provides a means whereby reflected power is diverted away from the microwave source in order to protect the microwave source from power unabsorbed by the workpiece. The directional coupler of the preferred embodiment is water-cooled for the dissipation of heat collected through the transmission of power from the microwave source and the reflection of power from the microwave cavity.

A first power meter is provided for measuring the power delivered to the microwave cavity. The first power meter is used in conjunction with a second power meter positioned to measure reflected power from the microwave cavity in order to monitor the efficiency of the microwave cavity and to insure that reflected power is dissipated in the reflected power load and not by the microwave source.

The reflected power load may also be used to test the functionality of the system by removing all workpieces from the microwave cavity, thus directing the entire signal from the microwave source into the reflected power load. Comparisons can be made of the power received by the reflected power load and the power delivered from the microwave source to determine any system losses.

The magnitude of the reflected power is detected by the second power meter. This magnitude may be used to determine the efficiency of the instant frequency of the microwave introduced into the microwave cavity. A lower reflected power will indicate a more efficient operating frequency due to the higher absorption rate of the selected workpiece.

In accordance with the present invention, a field-perturbing tool is disposed within the furnace cavity in order to perturb the electric field from a first distribution that would normally exist in the cavity with only the workpiece present at a given power and frequency to a second distribution that may be either more or less uniform depending on whether one wishes to selectively treat a portion of the workpiece or to uniformly treat a workpiece having some discontinuity on its surface. In either case, the operation of the field-perturbing tool is enhanced by sweeping the microwave frequency in a substantially continuous manner over some useful bandwidth, typically 5%.

Uniformity may be further enhanced by moving the field-perturbing tool or the workpiece relative to one another, either simultaneously with microwave operation or in an alternating mode. The field-perturbing tool may also be moved in order to process a batch of similar components in a piecewise manner. Alternatively, the field-perturbing tool may be configured with a plurality of operating surfaces whereby a batch of similar components may be processed simultaneously.

A variable frequency microwave heating apparatus incorporating various features of the present invention is designed to allow modulation of the frequency of the microwaves introduced into a microwave cavity for heating or other selected processes. Frequency modulation is an effective method of mode stirring as a means to create a generally uniform power distribution in a relatively small microwave cavity.

Figure 1:
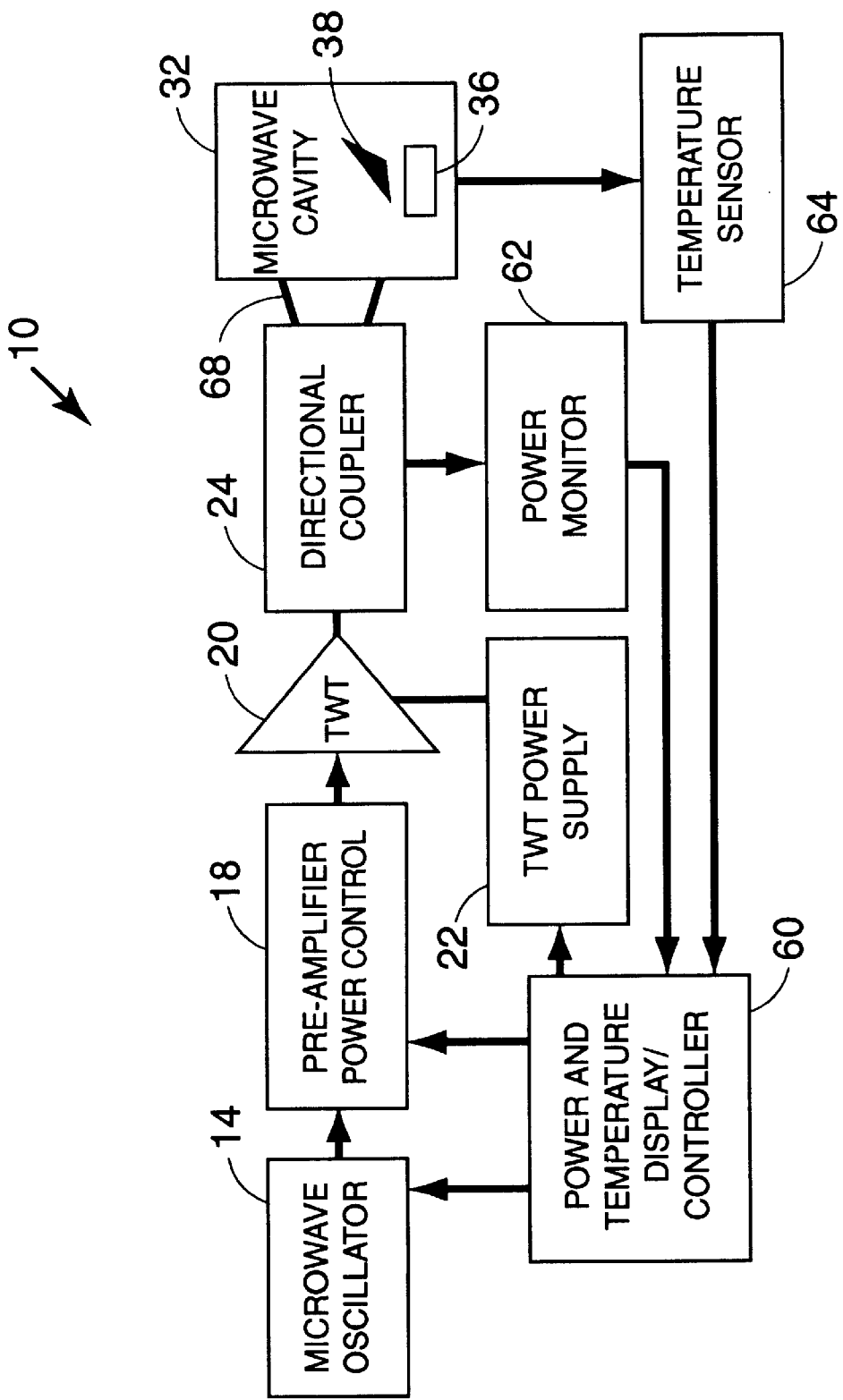
FIG. 1 is a schematic diagram of the preferred embodiment of the variable frequency microwave heating apparatus of the present invention.
Figure 2:
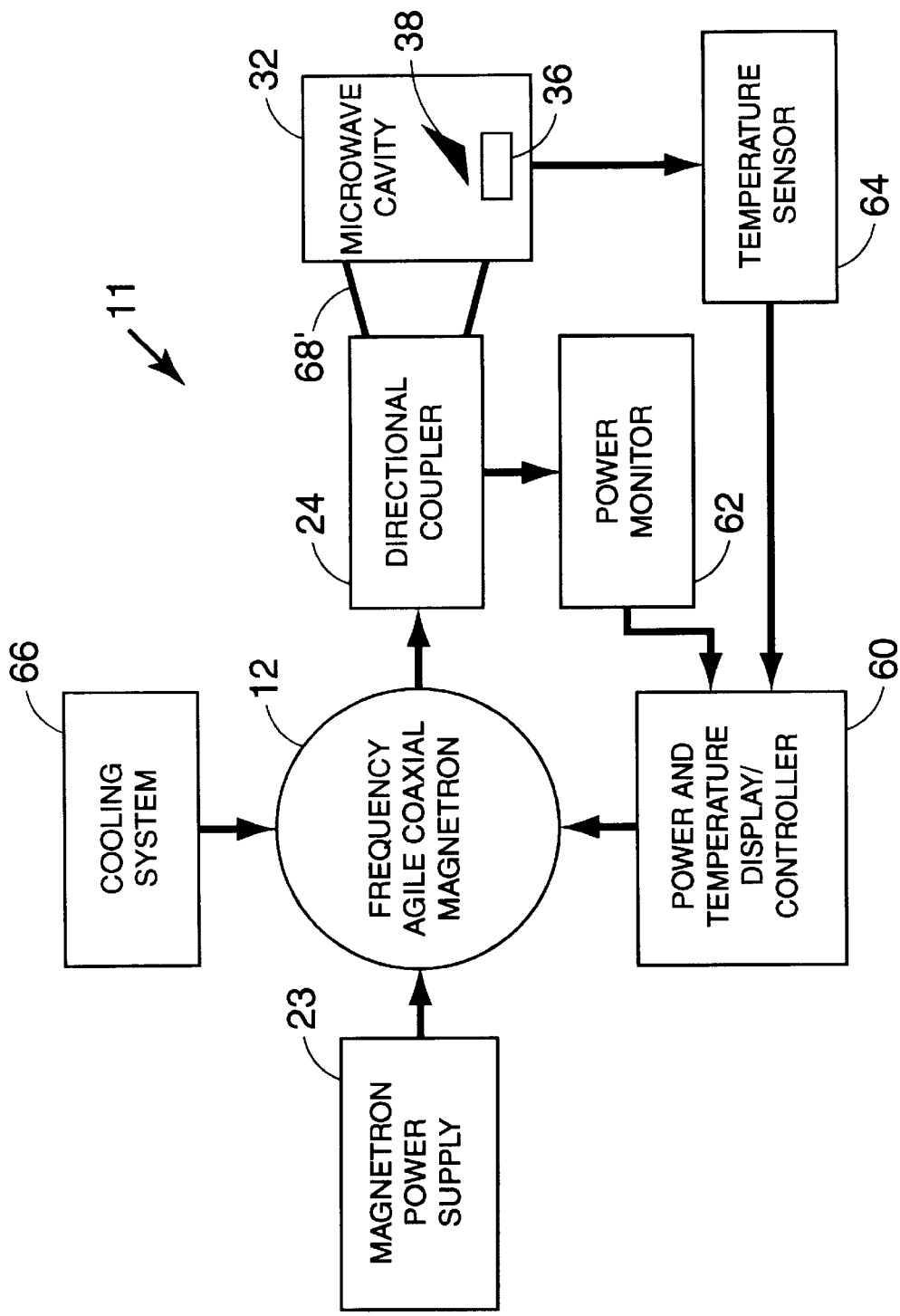
FIG. 2 illustrates a schematic diagram of another preferred embodiment of the variable frequency microwave heating apparatus of the present invention.

FIGS. 1, 2 each illustrate schematically an embodiment of the variable frequency microwave heating apparatus 10, 11 of the present invention. A field-perturbing tool 38 is disposed in the cavity 32 in order to perturb the electric field distribution in the vicinity of a selected workpiece 36 to be processed. Applicable processes include, but are not limited to, heat treatment, sterilization, sintering, plasma processing, ore processing, polymerization, etching, and preparing films. It will be understood that the term "workpiece" as used herein refers to a selected material or combination of materials to be processed in the microwave cavity 32. The term "workpiece" may further include such selected material or combination of materials wherein at least one of the materials is undergoing at least one phase change and is, therefore, in more than one phase at a given time.

Illustrated in FIG. 1 is one embodiment of the variable frequency microwave heating apparatus 10. In this embodiment, a power and temperature display and controller 60 receives input from a power monitor 62 and a temperature sensor 64. The power monitor 62 receives input from the directional coupler 24 and serves to monitor the reflected and forward power levels. The power and temperature display and controller 60 further serves to control the microwave oscillator 14, the pre-amplifier power control 18, and the TWT power supply 22. The TWT amplifier 20 serves as the high-power microwave source.

A tapered waveguide coupler 68 may be provided to enhance the efficiency with which the broadband microwave energy from the TWT 20 is coupled into the microwave cavity 32. By acting as an impedance transformer between the transmission line from the directional coupler 24 and the microwave cavity 32, this transition increases the percentage power coupled into the microwave cavity 32. In addition, for applications wherein the microwave energy must be coupled into a microwave cavity 32 wherein reactive gases are present, the tapered waveguide 68 provides a means of reducing the power density of the microwave energy at the interface between the microwave input window and reactive gases, thus preventing the formation of plasma discharges at the microwave input window.

EXAMPLE I

A variable frequency microwave heating apparatus 10 has been constructed for testing purposes using a 4–8 GHz Model T-1096 TWT source manufactured by Microwave Laboratories, Inc., and incorporating the tapered waveguide applicator 68. A generally cylindrical multimode microwave cavity 32 was also used. Results of the testing are discussed by R. A Rudder, et al., "Diamond CVD Via Microwave-Excited Plasma from Water-Ethanol Solutions," Amer. Cer. Soc. Spring Meeting, Cincinnati, Ohio, 1993, which is incorporated herein by reference. In those tests, it was demonstrated that the microwave heating apparatus 10 created high-intensity localized plasmas that could be moved and otherwise manipulated by adjusting the frequency. Dense plasmas were maintained with as little as 100 W of forward power. Reflected power was minimal at all frequencies across the 4–8 GHz bandwidth.

Illustrated in FIG. 2 is an alternate embodiment of the variable frequency microwave heating apparatus 11 of the present invention. In this alternate embodiment, a high-power oscillator 12 such as a frequency-agile coaxial magnetron, and requisite magnetron power supply 23 are substituted for the microwave oscillator, the pre-amplifier power control and the TWT of the previously described embodiment. A cooling system 66 is generally also employed. The magnetron 12 of the preferred embodiment has a usable bandwidth of at least 5% of its center frequency. The magnetron 12 is frequency-controlled either manually or, preferably, through a closed-loop, voltage-based feedback control system. In such a feedback control system, a low-level signal (0 to 10V) is used to activate a servo-mechanism in the magnetron which "tunes" the magnetron from one frequency to another by precise repositioning of a plunger plate in the magnetron's coaxial cavity.

EXAMPLE II

Figure 3:
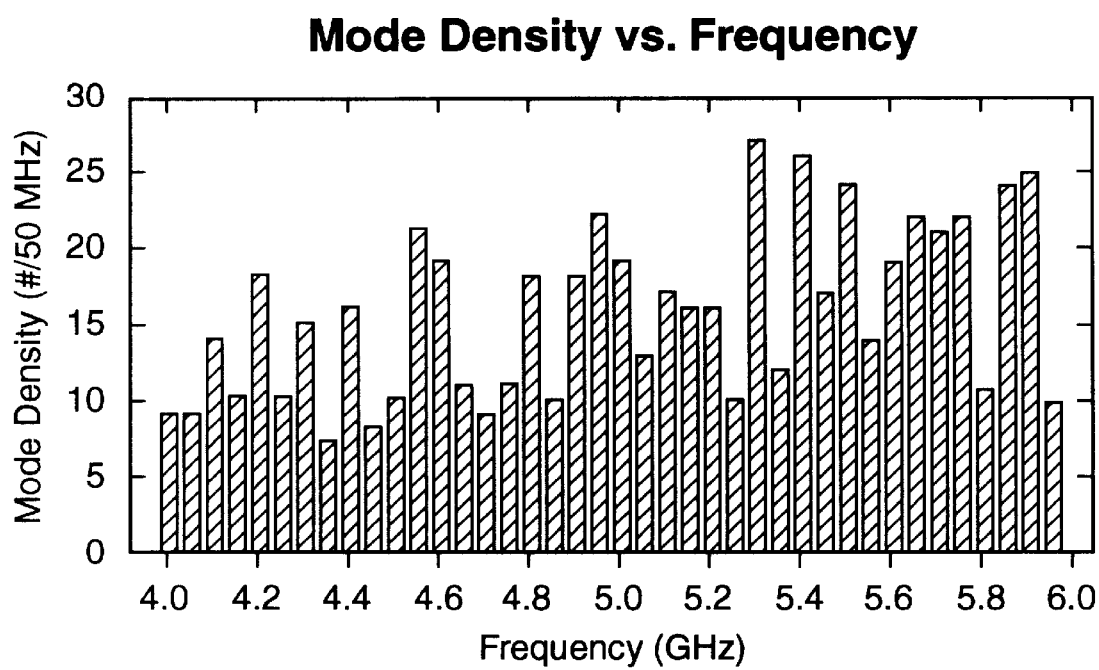
FIG. 3 is a graphical illustration of the mode density versus frequency for one rectangular microwave cavity used in accordance with the present invention.
Figure 4A:
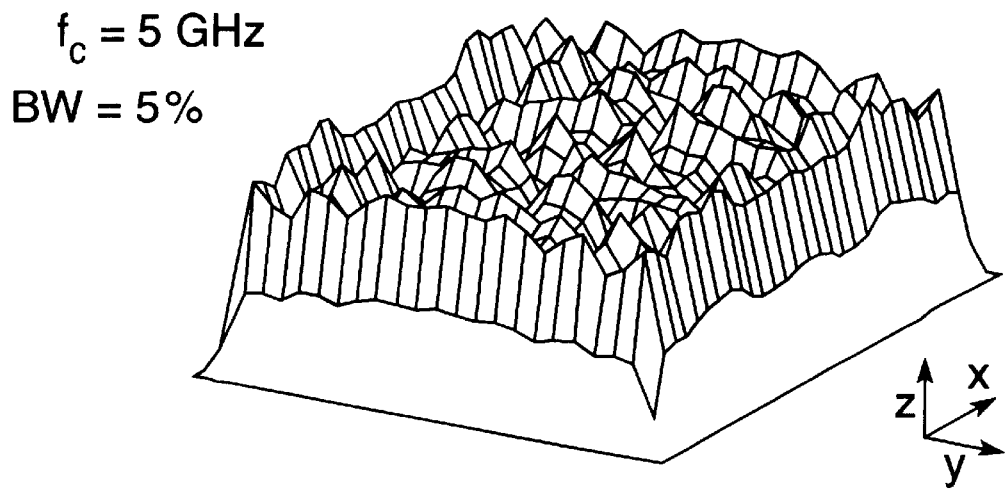
FIGS. 4a–4d graphically illustrate power distributions in a theoretical model of a microwave cavity and a variable frequency microwave source used in accordance with several features of the present invention.
Figure 4B:
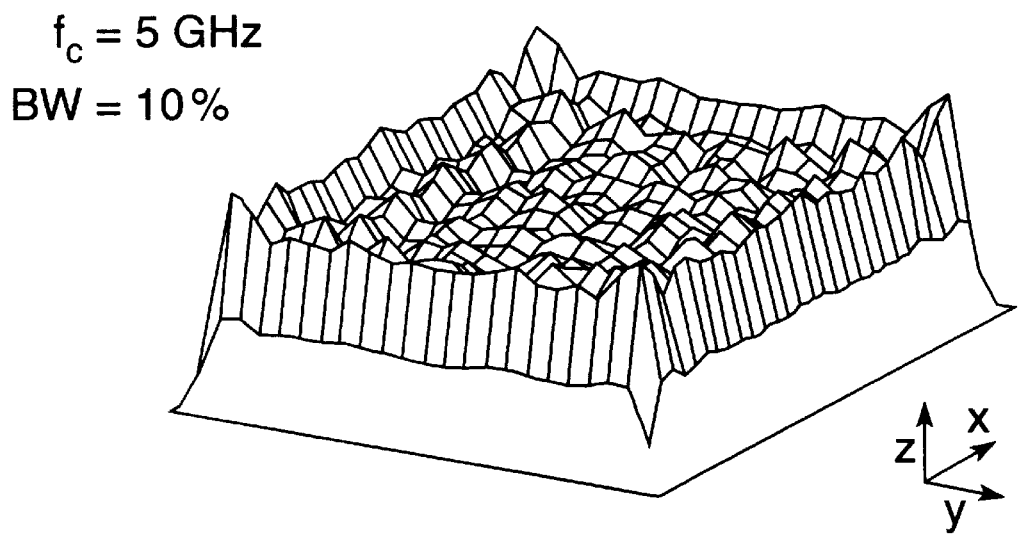
Figure 4C:
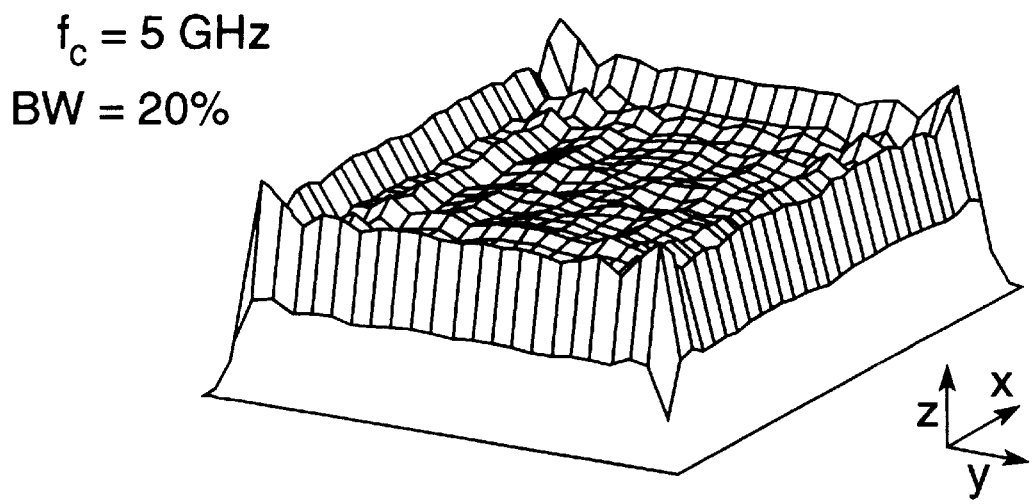
Figure 4D:
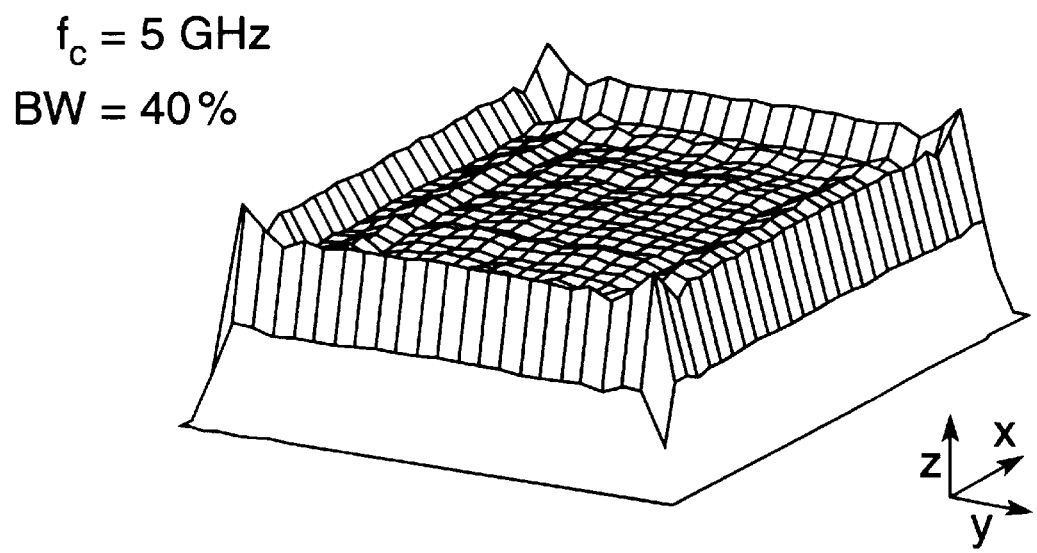

To better determine the limiting factor on required bandwidth, a theoretical model of a 13×12×10 inch rectangular microwave cavity 32 was constructed and used to determine the number of resonant modes capable of being supported in the cavity over the 4 to 6 GHz frequency range. The results of these calculations clearly demonstrate that, even in a cavity this small, there are an enormous number (over 600) of possible, closely-spaced modes (often 3 to 4 at a single frequency) over even the 4 to 6 GHz frequency range. These results have been graphically illustrated in FIG. 3 as mode density versus frequency. From these results, it is clear that a bandwidth of as little as 5% of the center frequency could, in some cases, provide sufficient mode plurality to provide relatively uniform baseline energy distribution in the microwave cavity.

Using this theoretical model, power density was calculated as a function of location at various points along a horizontal midplane of the (empty) microwave cavity. The first case examined assumed a center frequency of 5 GHz. As shown in FIG. 4, as the percent bandwidth decreased, the power distribution became progressively less uniform, where bandwidth is defined as the difference between the high and low frequencies divided by the center frequency, or:

$$(f_{high} - f_{low})/f_{center}.$$

The power density for bandwidths greater than about 10% is fairly uniform, whereas the power density becomes somewhat less uniform for a 5% bandwidth. A second case (not illustrated) assumed the same size cavity but a center frequency of 15 GHz, and power density was mapped for bandwidths ranging from 40% down to 1.3%. In this case, for a bandwidth as low as 2.5%, the power density was quite uniform compared to the previous case. Even when the bandwidth was further reduced to only 1.3%, the power density was sufficiently uniform for many microwave heating applications.

FIGS. 4a–4d illustrate power maps using the above theoretical model and a center frequency of 5 GHz. A power map, as used in this context, is a three-dimensional graph showing the power at various points across the microwave cavity 32. The power is shown as the z-coordinate, with the x- and y-coordinates being the floor plan of the microwave cavity 32. The bandwidth for each map is 5%, 10%, 20%, and 40% respectively. It will be noted that the power distribution throughout the microwave cavity becomes more even as the bandwidth increases. (The power distributions generally shown in FIG. 4 are the basis for those shown in the plots indicated at FIGS. 13B and 14B.)

Test results using thermal paper in a nominally empty cavity confirmed the predictions of theoretical modeling as described above and discussed in the paper "2 to 18 GHz Broadband Microwave Heating Systems" by R. J. Lauf et al., Microwave Journal, November 1993.

While a field-perturbing tool can be used in any microwave cavity, it is particularly useful when used in the aforedescribed variable frequency microwave cavity, for two reasons. First, sweeping the frequency creates a uniform environment within the near vicinity of the field-perturbing tool, so that the entire useful surface of the field-perturbing tool performs as expected, and the tool performs equally well at virtually any location within the cavity. Second, the uniform "baseline" power distribution created within the cavity by the frequency sweeping technique facilitates the design of the field-perturbing tool by making it possible to use predictive models of the unperturbed and perturbed electric fields as illustrated in a very simplified theoretical form as illustrated in FIGS. 13–14. The general unpredictability of single-frequency multimode cavities would make the design of the field-perturbing tool for a particular application very difficult and its operation would be inconsistent and unpredictable.

As will be illustrated in the following examples, the aforedescribed variable frequency microwave heating system can be made much more useful to selectively treat a variety of workpieces and carry out a variety of processing operations by introducing special tools within the microwave cavity to create a desired spatial power distribution by selectively perturbing the relatively uniform "baseline" power density created in the cavity by the variable frequency approach.

EXAMPLE III

Figure 5:
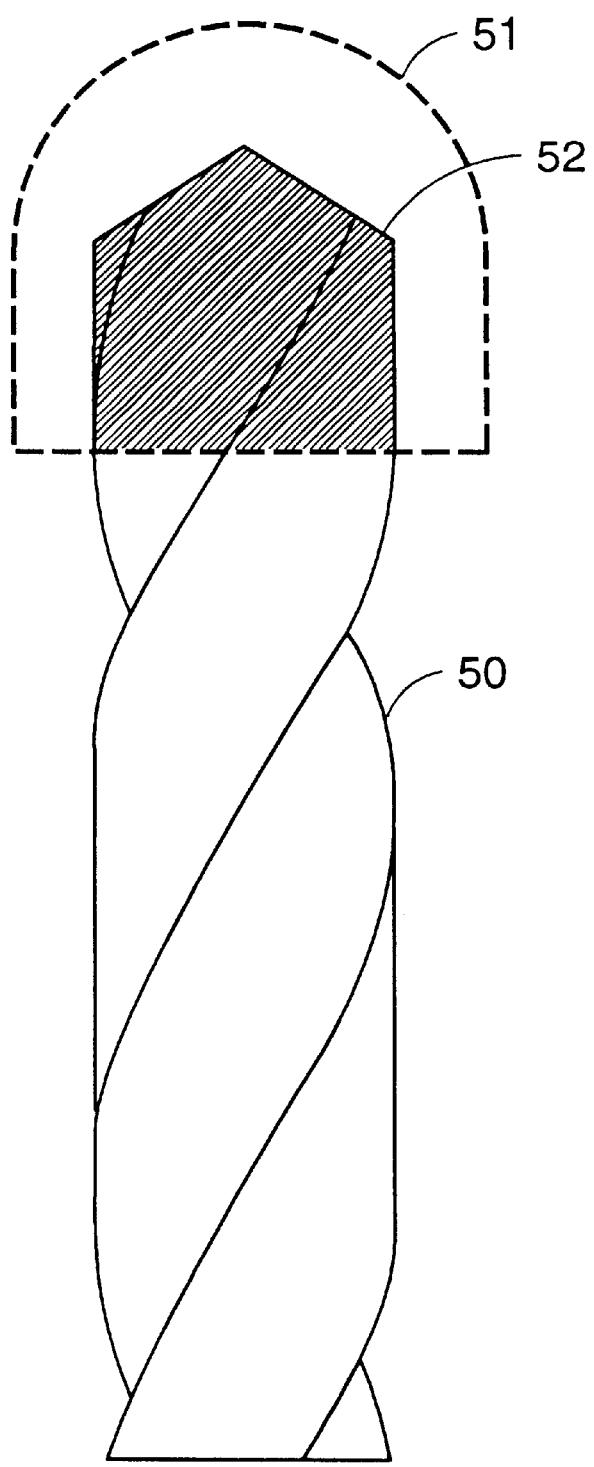
FIG. 5 illustrates the formation of a plasma at the edges of a metal drill bit while sweeping the microwave frequency.

A plasma chamber was constructed including a glass bell jar for observing the excitation of plasmas in mixtures of hydrogen and methane. The microwave source was a Microwave Laboratories, Inc. 4–8 GHz, T-1096 traveling wave tube, launching from the side into a multimode cavity. The atmosphere was about 0.9% $CH_4$ in $H_2$ at a pressure of about 28 torr. Steel drill bits 50 were placed in the bell jar with their tips upward and the TWT was operated at 1200 W forward power, sweeping the frequency from 4.1 to 6.7 GHz approximately 10 times per second. Surprisingly, plasmas 51 ignited stably at the tip of each drill bit as shown schematically in FIG. 5. This phenomenon occurred even with more than eight drill bits of differing sizes present in the chamber. This example illustrates how selected perturbations can be introduced into the uniform power environment of the variable frequency microwave system with predictable, controllable, and stable results. Diamond 52 can be selectively deposited in the areas adjacent to the plasma discharge.

EXAMPLE IV

Figure 6A:
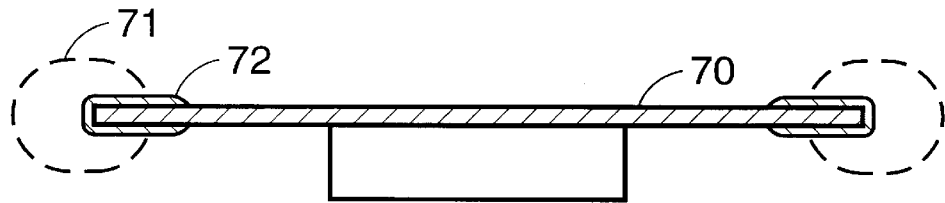
FIG. 6a illustrates the formation of a plasma at the periphery of a silicon wafer while sweeping the frequency.

In a system similar to that in the preceding example, a silicon wafer 70 was placed horizontally on a pedestal as shown in cross section in FIG. 6a. Plasma 71 ignited uniformly around the periphery of the wafer, selectively depositing diamond 72 as shown. An improved setup, shown in FIG. 6b, used a field-perturbing tool 73 with a graded impedance to reduce the tendency for selective plasma discharge by equalizing the electric field in the vicinity of the wafer 70.

The field-perturbing tool 73 comprises an alumina base layer 74, an alumina-silicon carbide intermediate layer 75, and a silicon carbide top layer 76.

Figure 6B:
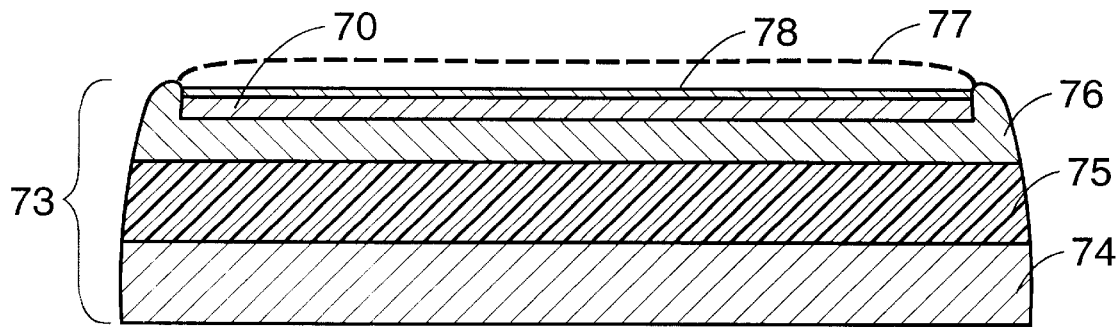
FIG. 6b illustrates the use of a graded dielectric tool to suppress the edge effect.

The field-perturbing 73 tool illustrated in FIG. 6b was constructed as a demonstration of the potential of the field-perturbing tool and associated method to equalize the power distribution around a workpiece containing a physical discontinuity as illustrated theoretically in FIG. 14. Skilled artisans will appreciate that the technique could be used to create even more optimal tooling by, for example, using more layers with intermediate dielectric properties or by creating a single tool with a functionally graded structure. Such a structure could, for example, comprise a body shaped as shown in FIG. 6b, but with a graded internal composition changing gradually from alumina at the base to alumina-silicon or silicon carbide at the top. The field-perturbing tool could equally well contain one or more internal metallizations, disposed in such a way that one or more bias potentials may be established at various points there-along through connections to an external voltage source. In all of the foregoing modifications, the theoretical design and engineering of the field-perturbing tool is facilitated by the uniform "baseline" power density within the microwave cavity afforded by frequency sweeping.

Moreover, it will be appreciated that in some cases, it is desirable to selectively coat a portion of a workpiece in a pattern, rather than depositing a uniform coating across the entire surface thereof.

EXAMPLE V

Figure 7A:
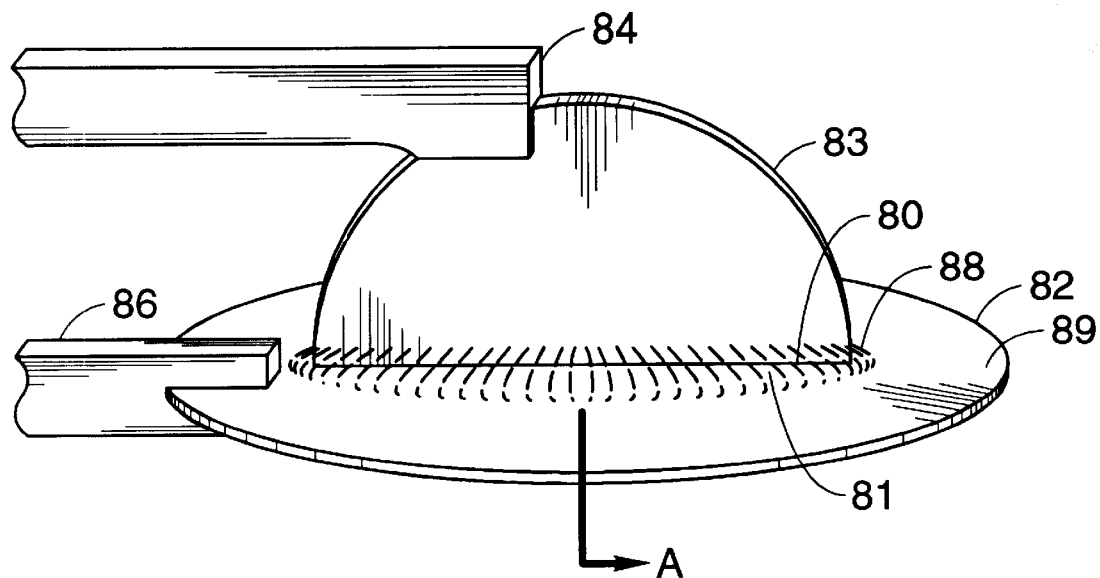
FIGS. 7a–7c illustrate the selective formation of a plasma between the planar surface of a silicon wafer and the flat edge of a silicon tool held near the surface of the wafer at right angles to it.
Figure 7B:
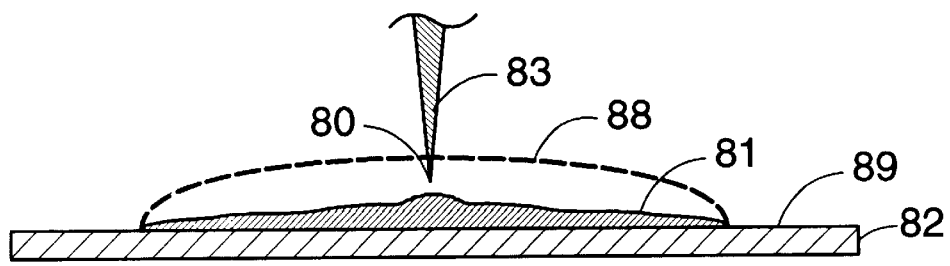
Figure 7C:
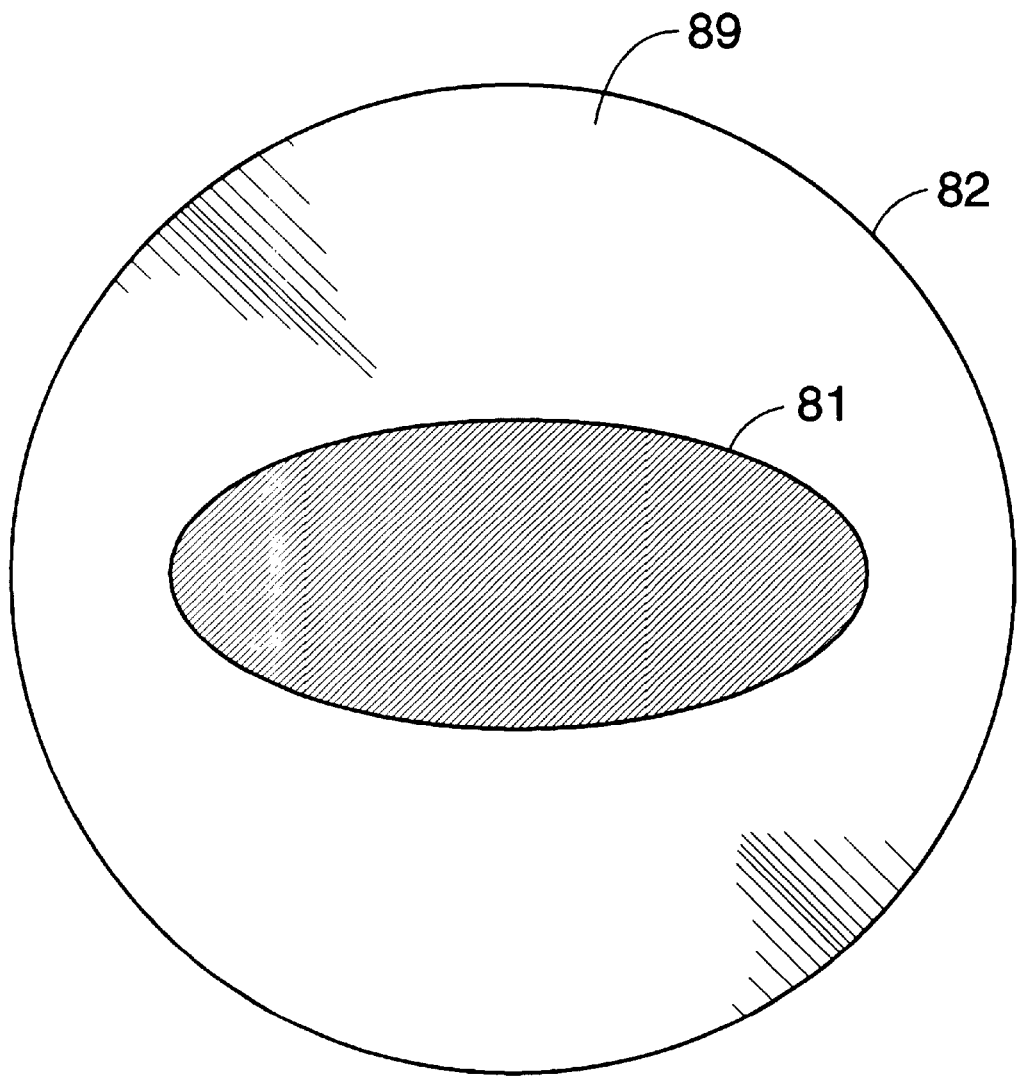

In a system similar to that of the preceding examples, a silicon wafer 82 was mounted in an alumina holder 86 and a Si field-perturbing tool 83 was mounted on a second alumina holder 84 with a flat edge 80 normal to the surface 89 of wafer 82 as shown in FIGS. 7a and 7b. A plasma 88 was selectively ignited. As shown in FIGS. 7b and 7c, the deposition of diamond 81 was enhanced in the vicinity of the plasma 88.

EXAMPLE VI

Figure 8:
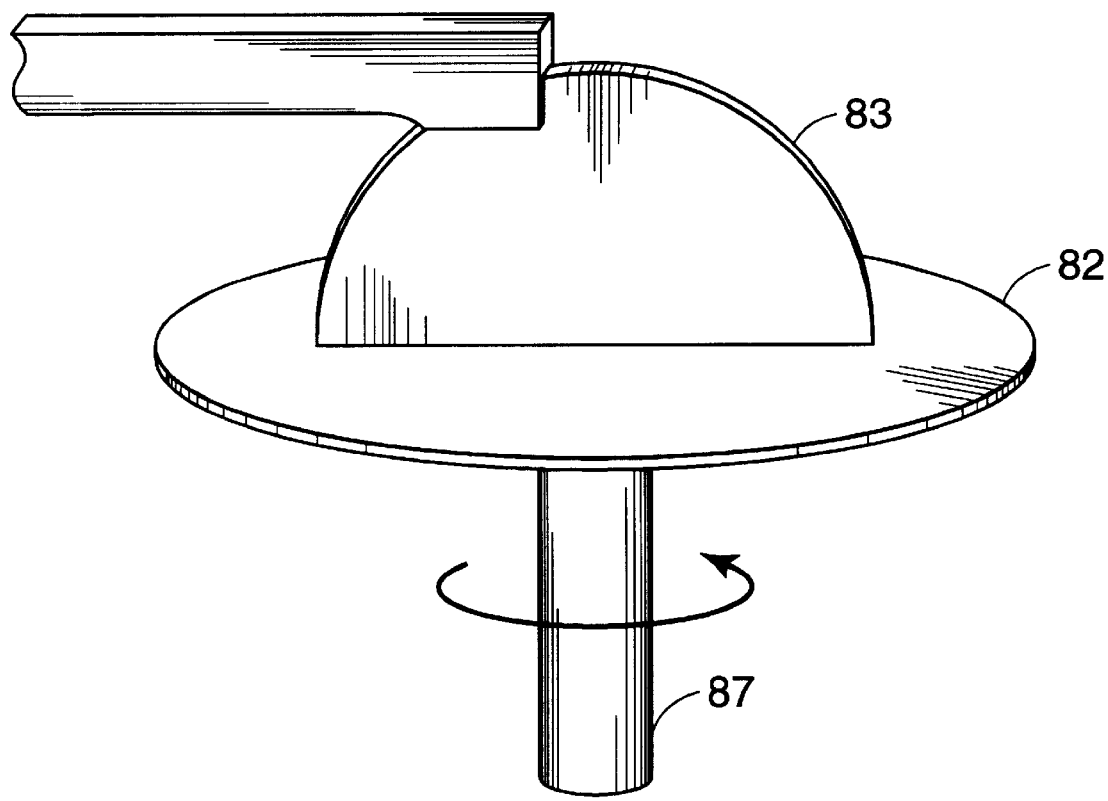
FIG. 8 illustrates the method of moving a tool relative to a substrate in order to selectively process a portion of the substrate.

In a system similar to that of the preceding examples, a field-perturbing tool 83 was disposed above a silicon wafer 82 on a rotatable supporting rod 87, as shown in FIG. 8. The wafer 82 was rotated during deposition of diamond, improving the uniformity of diamond deposition, and could be manipulated further by adjusting the relative position of the tool 83 relative to the axis of rotation of the wafer 82.

EXAMPLE VII

Figure 9A:
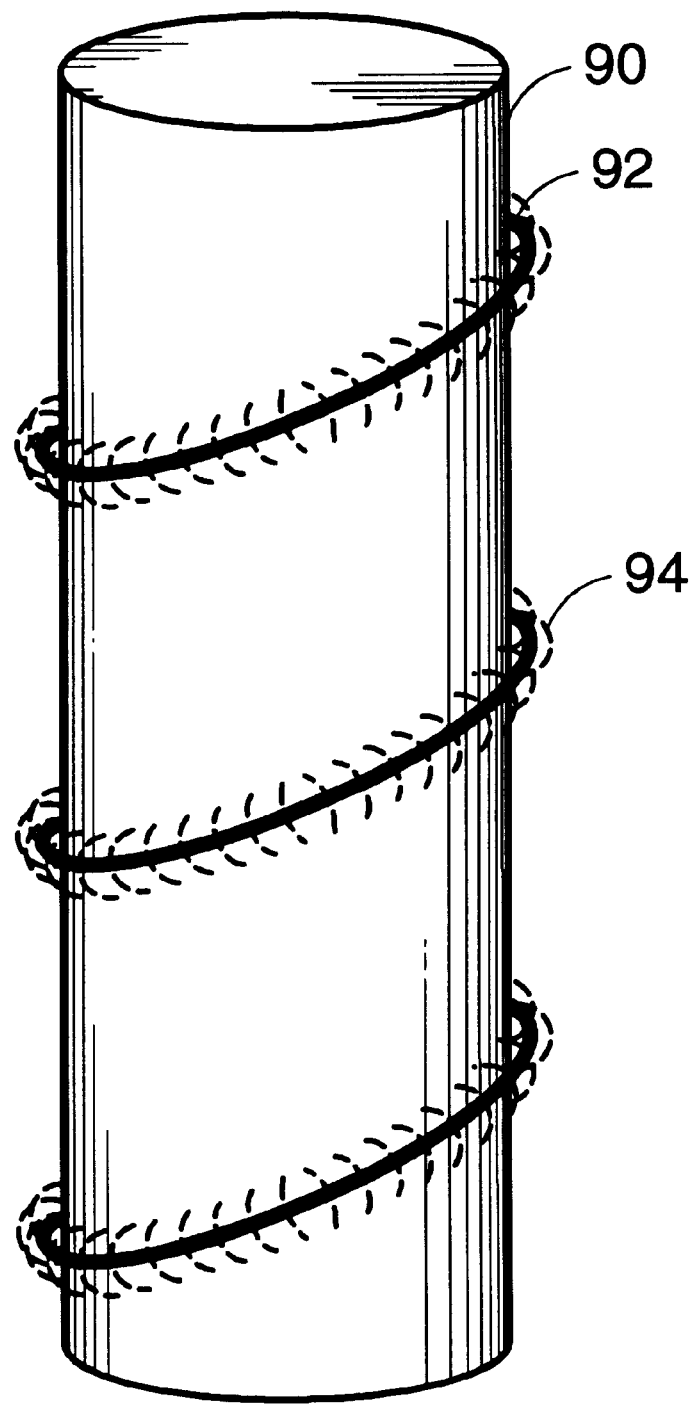
FIGS. 9a and 9b illustrate the selective formation of a plasma in the vicinity of a metal wire disposed near a metal workpiece.
Figure 9B:
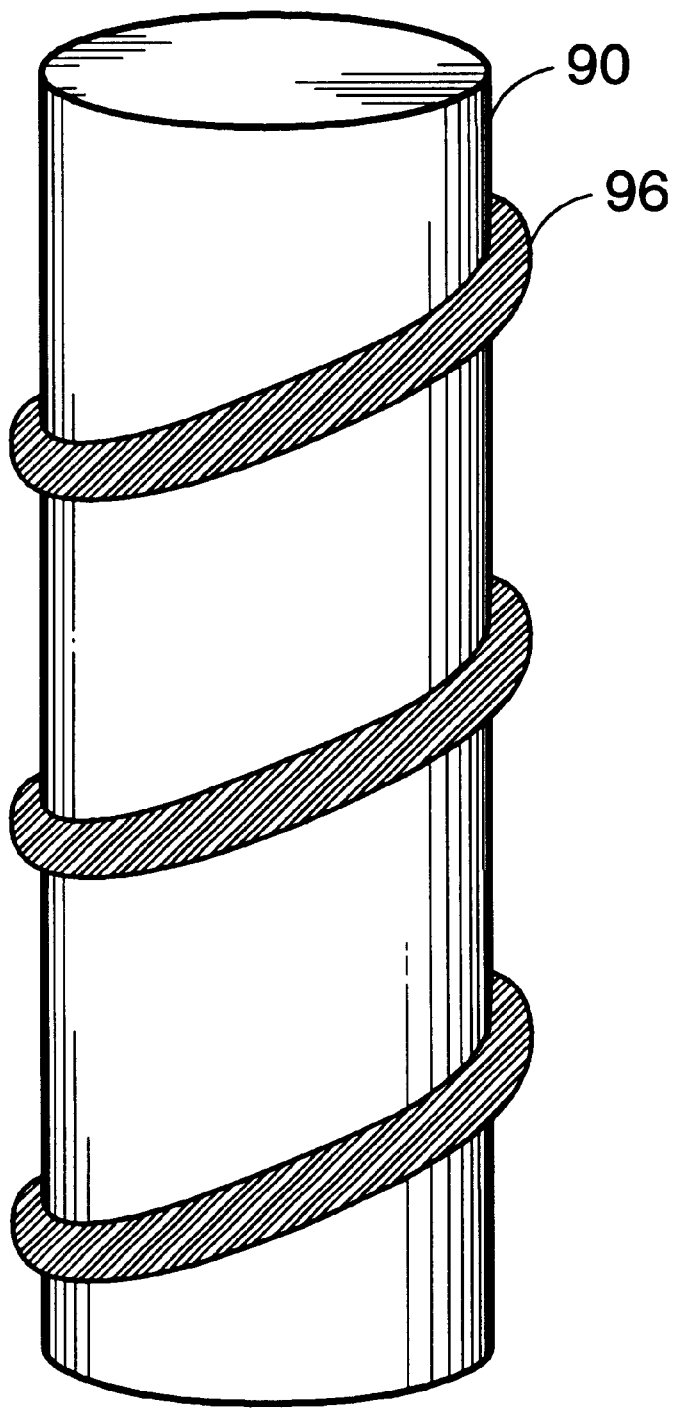

In a system similar to that of the preceding examples, a wire 92 is disposed near a cylindrical workpiece 90 thereby igniting a localized plasma 94 and depositing diamond 96 as illustrated in FIGS. 9a and 9b.

EXAMPLE VIII

Figure 10:
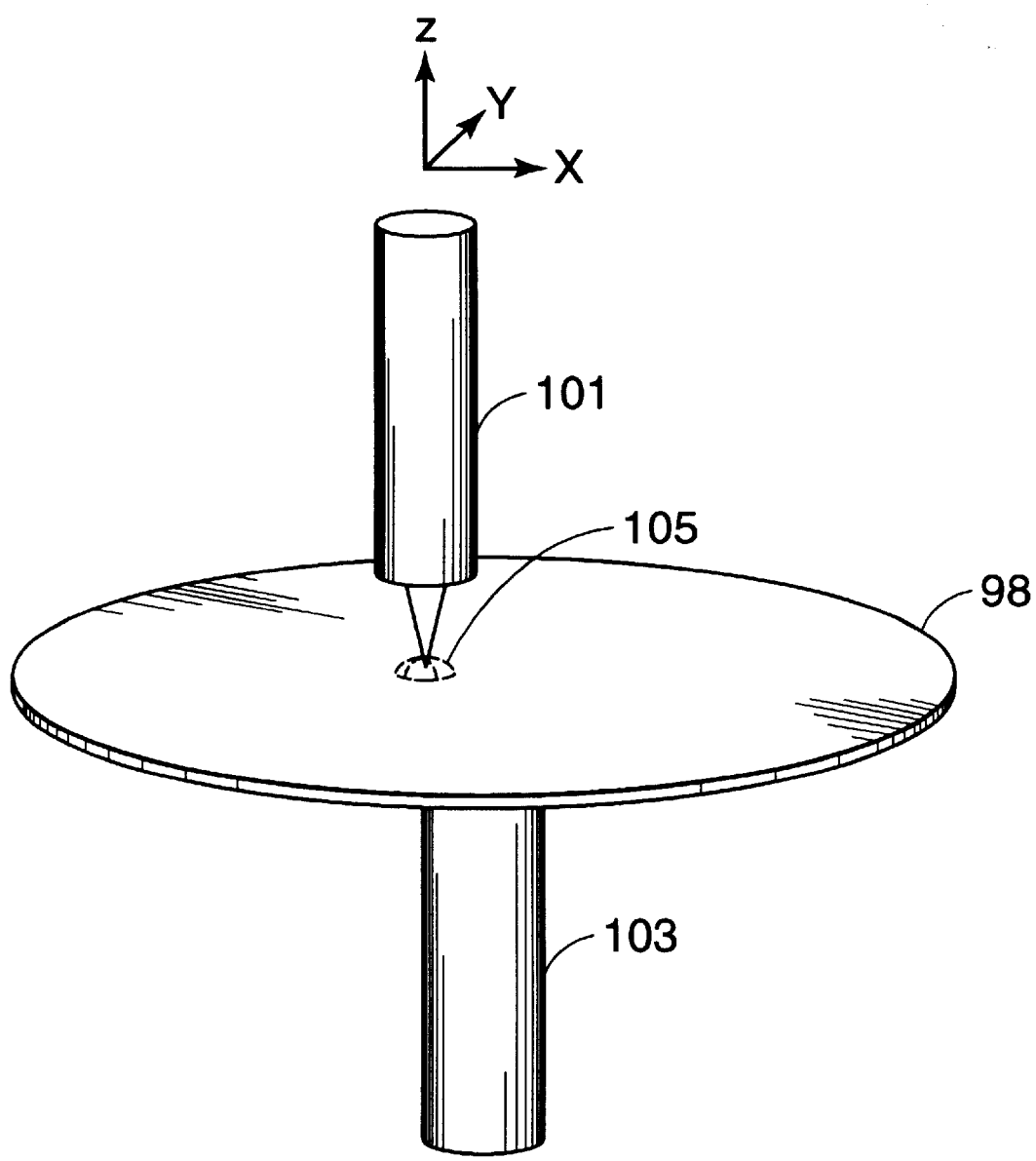
FIG. 10 illustrates the method of moving a tool relative to a substrate in order to uniformly process a large area or to selectively create a desired pattern upon the substrate.
Figure 11:
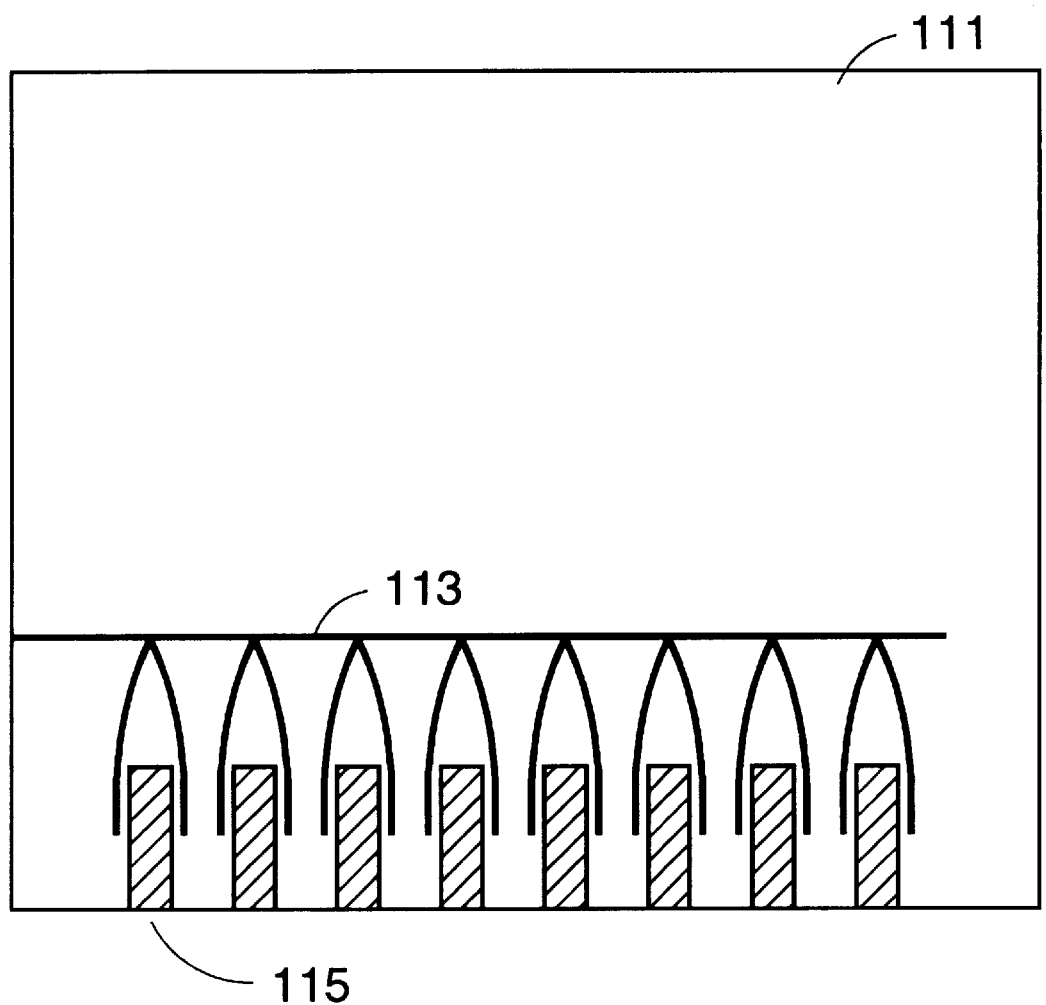
FIG. 11 illustrates a tool used to process a batch of components simultaneously.
Figure 12:
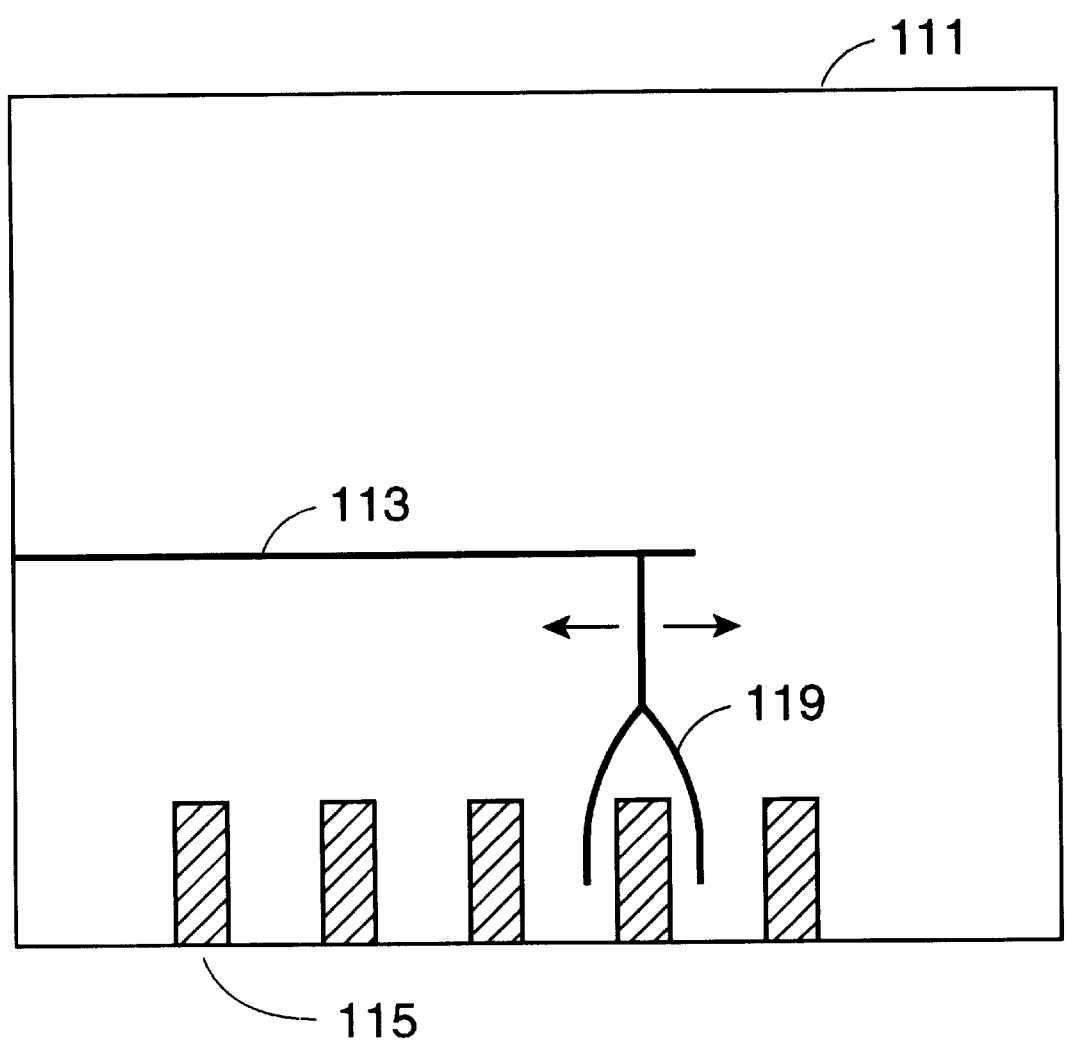
FIG. 12 illustrates a tool used to process a batch of components in a piecewise manner.

As illustrated in FIG. 10, a field-perturbing tool 101 is reduced to a fine point for igniting a very localized plasma 105 on the substrate 98. By moving the tool 101 along the x-y axes while keeping a constant distance along the z axis from the substrate 98, a coating of any desired pattern may be "written" upon the substrate. The coating thickness may be varied as well, by controlling the dwell time of the tool 101 at any selected point in its x-y path. In this embodiment, the power uniformity throughout the entire cavity, attributable to the variable frequency approach, allows the tool 101 to generate a stable and reproducible plasma regardless of its x-y location about the surface of the substrate 98.

EXAMPLE IX

The configuration of tool 101 illustrated in FIG. 10 could equally well be used in a plasma etching operation, wherein material would be selectively removed from the substrate 98 rather than deposited as a coating upon it. By analogy to the previous example, the amount of material removed from the substrate 98 at any point may be controlled by controlling the dwell time of the tool 101 at any selected point in its x-y path.

The present invention can be applied to apparatus and methods involving other forms of electromagnetic energy, e.g., RF, using the teachings set forth hereinabove.

While several preferred embodiments have been shown and described, and several embodiments which have been constructed and tested have been specifically delineated, it will be understood that such descriptions are not intended to limit the disclosure, but rather it is intended to cover all modifications and alternate methods falling within the spirit and the scope of the present invention as defined in the appended claims or their equivalents.

What is claimed is:

1. An apparatus for microwave plasma processing, said apparatus comprising:
   a multimode microwave applicator cavity for exposing a workpiece to microwave energy;
   a microwave source disposed to direct microwave energy into said cavity said microwave source having a usable bandwidth of at least 5% of a center frequency; and
   at least one field-perturbing tool disposed proximate to said workpiece to apply a controlled, localized microwave plasma to at least one selected portion of said workpiece by modifying a local electric field distribution in the vicinity of said workpiece.

2. An apparatus in accordance with claim 1 further comprising a controllable moving means for moving said field-perturbing tool relative to said workpiece in order to apply a controlled amount of the microwave plasma to at least one further selected portion of said workpiece.

3. An apparatus in accordance with claim 1 further comprising a controllable moving means for moving said workpiece relative to said field-perturbing tool in order to apply a controlled amount of the microwave plasma to at least one further selected portion of said workpiece.

4. An apparatus in accordance with claim 1 further comprising temperature measuring means for measuring the temperature of said workpiece during exposure to microwave energy.

5. An apparatus in accordance with claim 1 wherein said apparatus is adapted for simultaneously exposing a multiplicity of workpieces to the microwave plasma.

6. An apparatus in accordance with claim 1 wherein said apparatus is adapted for sequentially exposing a multiplicity of workpieces to the microwave plasma.

7. An apparatus in accordance with claim 1 wherein the local electric field perturbation by said field-perturbing tool is adapted to at least partially compensate for a local perturbation of the microwave field by said workpiece to improve uniformity of exposure of said workpiece to the plasma.

8. An apparatus in accordance with claim 1 wherein said microwave cavity is adapted for maintaining an internal pressure less than atmospheric pressure.

9. An apparatus in accordance with claim 1 wherein said microwave cavity is adapted for maintaining an internal gas atmosphere other than air.

10. An apparatus in accordance with claim 1 wherein said apparatus is adapted for generating a microwave plasma for etching a selected surface area of said workpiece.

11. An apparatus in accordance with claim 1 wherein said apparatus is adapted for microwave plasma-assisted deposition of a solid coating upon a selected surface area of said workpiece.

12. An apparatus for microwave plasma processing comprising:
   a multimode microwave applicator cavity for exposing a workpiece to microwave energy;
   a microwave source adapted for sweeping the frequency of microwave energy introduced into said cavity over a usable bandwidth of at least five percent of a center frequency so that the unperturbed time-averaged microwave power density within said cavity is substantially uniform; and
   at least one field-perturbing tool disposed proximate to said workpiece to apply a controlled, localized microwave plasma to at least one selected portion of said workpiece by modifying a local electric field distribution in the vicinity of said workpiece.

13. An apparatus in accordance with claim 12 further comprising a controllable moving means for moving said field-perturbing tool relative to said workpiece in order to apply a controlled amount of the microwave plasma to at least one further selected portion of said workpiece.

14. An apparatus in accordance with claim 12 further comprising a controllable moving means for moving said workpiece relative to said field-perturbing tool in order to apply a controlled amount of the microwave plasma to at least one further selected portion of said workpiece.

15. An apparatus in accordance with claim 12 further including a temperature measuring means for measuring the temperature of said workpiece during exposure to the microwave energy.

16. An apparatus in accordance with claim 12 wherein said apparatus is adapted for simultaneously exposing a multiplicity of workpieces to the microwave plasma.

17. An apparatus in accordance with claim 12 wherein said apparatus is adapted for sequentially exposing a multiplicity of workpieces to the microwave plasma.

18. An apparatus in accordance with claim 12 wherein the local electric field perturbation by said field-perturbing tool at least partially compensates for the local perturbation of the existing field by said workpiece in the absence of said field-perturbing tool, thereby improving uniformity of exposure of said workpiece to the microwave plasma.

19. An apparatus in accordance with claim 12 wherein said multimode microwave cavity is capable of maintaining an internal pressure less than atmospheric pressure.

20. An apparatus in accordance with claim 12 wherein said multimode microwave cavity is adapted for maintaining an internal gas atmosphere other than air.

21. An apparatus in accordance with claim 12 wherein said apparatus is adapted for generating a microwave plasma for etching a selected surface area of said workpiece.

22. An apparatus in accordance with claim 12 wherein said apparatus is adapted for microwave plasma-assisted deposition of a solid coating upon a selected surface area of said workpiece.

23. A method of microwave plasma processing comprising the steps of:
   a. introducing a workpiece into a multimode microwave cavity having a substantially uniform power density; and
   b. directing microwave energy having A bandwidth of at least 5% into said microwave cavity in the presence of a field-perturbing tool disposed proximate to said workpiece in said microwave cavity so that said field-perturbing tool locally perturbs said microwave field in the vicinity of said workpiece in order to apply a controlled, localized microwave plasma to at least one selected portion of said workpiece.

24. A method in accordance with claim 23 further including the step of moving said tool relative to said workpiece to process an additional selected portion of said workpiece.

25. A method in accordance with claim 23 further including the step of moving said workpiece relative to said tool to process an additional selected portion of said workpiece.

26. A method in accordance with claim 23 wherein a plurality of workpieces are processed simultaneously.

27. A method in accordance with claim 23 wherein a plurality of workpieces are processed sequentially.

28. A method in accordance with claim 23 wherein the local electric field perturbation by said tool at least partially compensates for the local perturbation of the existing field by said workpiece in the absence of said tool, thereby improving uniformity of said microwave plasma processing.

29. A method for microwave plasma processing comprising the steps of:
   a. introducing a workpiece into a multimode microwave cavity having a substantially uniform power density; and
   b. directing frequency-swept microwave energy having a bandwidth of at least 5% into said microwave cavity in the presence of a field perturbing tool disposed proximate to said workpiece in said microwave cavity so that said field-perturbing tool locally perturbs said microwave field in the vicinity of said workpiece in order to apply a controlled, localized microwave plasma to at least one selected portion of said workpiece.

30. A method in accordance with claim 29 comprising the additional step, prior to step c, of introducing a selected gas mixture into said cavity at an absolute pressure less than atmospheric.

\* \* \* \* \*